(12) United States Patent
Lord (10) Patent No.: US 12,250,298 B2
(45) Date of Patent: Mar. 11, 2025

(54) TO QKD NETWORK ARCHITECTURES

(71) Applicant: BRITISH TELECOMMUNICATIONS PUBLIC LIMITED COMPANY, London (GB)

(72) Inventor: Andrew Lord, London (GB)

(73) Assignee: British Telecommunications Public Limited Company (GB)

( * ) Notice: Subject to any disclaimer, the term of this patent is extended or adjusted under 35 U.S.C. 154(b) by 316 days.

(21) Appl. No.: 17/593,683

(22) PCT Filed: Mar. 11, 2020

(86) PCT No.: PCT/EP2020/056548
§ 371 (c)(1),
(2) Date: Sep. 22, 2021

(87) PCT Pub. No.: WO2020/193146
PCT Pub. Date: Oct. 1, 2020

(65) Prior Publication Data
US 2022/0166611 A1    May 26, 2022

(30) Foreign Application Priority Data
Mar. 22, 2019 (EP) .................. 19164656

(51) Int. Cl.
  *H04L 9/08* (2006.01)
  *H04B 10/25* (2013.01)
  *H04B 10/70* (2013.01)

(52) U.S. Cl.
  CPC ........... *H04L 9/0852* (2013.01); *H04B 10/25* (2013.01); *H04B 10/70* (2013.01)

(58) Field of Classification Search
  CPC ..... H04L 9/0852; H04L 9/0855; H04L 9/083; H04B 10/25; H04B 10/70
  See application file for complete search history.

(56) References Cited

U.S. PATENT DOCUMENTS

| | | | |
|---|---|---|---|
| 5,850,441 A | 12/1998 | Townsend et al. | |
| 7,826,749 B2 | 11/2010 | Luo et al. | |
| 8,792,791 B2 | 7/2014 | Wiseman et al. | |
| 9,559,802 B1* | 1/2017 | Dashti ................. | H04J 14/0246 |

(Continued)

FOREIGN PATENT DOCUMENTS

| | | |
|---|---|---|
| CN | 104092538 A | 10/2014 |
| CN | 109217938 A | 1/2019 |

(Continued)

OTHER PUBLICATIONS

Combined Search and Examination Report under Section 17 and 18(3) for GB Application No. 1903952.8, mailed on Sep. 19, 2019, 5 pages.

(Continued)

*Primary Examiner* — Mohammed Waliullah
(74) *Attorney, Agent, or Firm* — EIP US LLP (57) ABSTRACT

A system of transmitting optical pulses from a transmitter to first and second receivers for the purposes of quantum key distribution is disclosed. The system can include a transmitter configured to transmit a plurality of optical pulses; first and second receivers configured to receive some or all of the plurality of optical pulses; a guide for guiding the plurality of optical pulses, the guide having first and second output ports, the first output port being in optical communication with the first receiver and the second output port being in optical communication with the second receiver, the guide being configured to output a proportion of the optical pulses at the first output port and a proportion of the optical pulses at the second output port, modification means for modifying the guide so as to change the proportion of the optical pulses output at the first output port.

12 Claims, 5 Drawing Sheets

(56) References Cited

U.S. PATENT DOCUMENTS

| | | |
|---|---|---|
| 2005/0249352 A1 | 11/2005 | Choi et al. |
| 2007/0248229 A1 | 10/2007 | Kawamoto et al. |
| 2010/0299526 A1 | 11/2010 | Wiseman et al. |
| 2011/0069972 A1* | 3/2011 | Wiseman ............... H04L 9/0852 398/186 |
| 2011/0085666 A1 | 4/2011 | Hicks |
| 2012/0328290 A1 | 12/2012 | Yuan et al. |
| 2013/0051800 A1 | 2/2013 | Soto et al. |
| 2014/0112478 A1 | 4/2014 | Arahira |
| 2019/0222415 A1 | 7/2019 | Kikawada et al. |
| 2020/0044835 A1 | 2/2020 | Legre et al. |
| 2020/0350995 A1 | 11/2020 | Lord |
| 2020/0389299 A1 | 12/2020 | White et al. |
| 2021/0126778 A1 | 4/2021 | Parkin et al. |

FOREIGN PATENT DOCUMENTS

| | | | |
|---|---|---|---|
| CN | 107566041 B | 11/2022 | |
| EP | 0717895 B1 | 11/1998 | |
| EP | 3301851 A1 | 4/2018 | |
| EP | 3340529 A1 | 6/2018 | |
| GB | 2534917 A * | 8/2016 | ............ H04B 10/70 |
| GB | 2560564 A | 9/2018 | |
| KR | 101590105 B1 | 2/2016 | |
| WO | WO-2009141586 A1 | 11/2009 | |
| WO | WO-2018130052 A1 | 7/2018 | |

OTHER PUBLICATIONS

Combined Search and Examination Report under Section 17 and 18(3) for GB Application No. 1903954.4, mailed on Sep. 20, 2019, 6 pages.

Extended European Search Report for Application No. 19164656.1, mailed on Sep. 5, 2019, 8 pages.

Extended European Search Report for Application No. 19164657.9, mailed on Sep. 23, 2019, 9 pages.

Honjo T., et al., "Quantum key Distribution Experiment through a PLC Matrix Switch," Optics Communications, 2006, vol. 263, XP028081418, ISSN: 0030-4018, DoI:10.1016/J.OPTION.2006-07-01, pp. 120-123.

International Search Report and Written Opinion for Application No. PCT/EP2020/056551, mailed on Jul. 2, 2020, 13 pages.

International Search Report and Written Opinion for Application No. PCT/EP2020/056548, mailed on May 27, 2020, 12 pages.

Maeda W., et al., "Technologies for Quantum Key Distribution Networks Integrated With Optical Communication Networks," IEEE Journal of Selected Topics in Quantum Electronics, Nov./Dec. 2009, vol. 15, No. 6, 11 pages.

Office Action for GB Application No. 1903952.8, mailed on Jul. 19, 2021, 4 pages.

Tang X., et al., "Demonstration of an Active Quantum Key Distribution Network," Proceedings of the SPIE—The International Society for Optical Engineering SPIE—Vertical-Cavity Surface-Emitting Lasers XIII, Aug. 31, 2006, vol. 6305, XP055615247, SPIE OPTO: Integrated Optoelectronic DevicesJan. 24-29, 2009an Jose, California, Untied States ISSN: 0277-786X, D01: 10.1117/12.679589, 6 pages.

Office Action received for Chinese Patent Application No. 202080019394.9, mailed on Jan. 5, 2024, 18 pages (11 pages of English Translation and 7 pages of Official Copy).

Office Action received for Chinese Patent Application No. 202080019414.2, mailed on Jan. 23, 2024, 6 pages (3 pages of English Translation and 3 pages of Official Copy).

* cited by examiner

TO QKD NETWORK ARCHITECTURES

PRIORITY CLAIM

The present application is a National Phase entry of PCT Application No. PCT/EP2020/056548, filed Mar. 11, 2020, which claims priority from EP Patent Application No. 19164656.1, filed Mar. 22, 2019, each of which is hereby fully incorporated herein by reference.

BACKGROUND

QKD (Quantum Key Distribution) is a known method of highly-secure communication which enables two parties to produce a shared secret key. In the broadest sense, QKD networks involve a transmitting unit (referred to as Alice) which generates a single photon pulse, encodes it with a randomly-chosen value of 0 or 1 and applies a modulation to it. In a known example system this is done by polarizing the pulse using a randomly-chosen polarization basis. The pulse is then transmitted to a receiving unit (referred to as Bob) which attempts to measure the encoded value. In the example system this is done by passing the pulse through a polarizer with a randomly-chosen polarization basis. The process is repeated for multiple pulses. Alice and Bob then exchange information regarding the pulses and, in doing so, arrive at a shared secret key.

QKD arrangements are expensive and one way of reducing costs is to have a single Alice which transmits pulses to multiple Bobs. Such arrangements have a branched optical path so that each Bob receives a proportion of the pulses. Optical splitters have been used to provide the branched optical path. A problem with splitting the signal is that some of the Bobs may not receive a sufficiently high pulse rate to meet their key generation demands. This is particularly true if, say, one Bob needs to produce a larger number of keys than the others. It may also be true if one Bob is located further from the splitter than the others (as the pulses directed to it will suffer more attenuation), or if there are a large number of Bobs. In such situations the pulse receipt rate at the Bobs may not be high enough to keep the session with Alice active. If this happens, lengthy re-establishment procedures are required in order to re-establish the session.

It would be desirable to overcome or mitigate some and/or all of the above-mentioned and/or other disadvantages.

SUMMARY

According to a first aspect of the disclosure there is provided a system of transmitting optical pulses from a transmitter to first and second receivers for the purposes of quantum key distribution, the system comprising: a transmitter configured to transmit a plurality of optical pulses; first and second receivers configured to receive some or all of the plurality of optical pulses; a guide for guiding the plurality of optical pulses, the guide having first and second output ports, the first output port being in optical communication with the first receiver and the second output port being in optical communication with the second receiver, the guide being configured to output a proportion of the optical pulses at the first output port and a proportion of the optical pulses at the second output port, modification means for modifying the guide so as to change the proportion of the optical pulses output at the first output port.

According to a second aspect of the disclosure there is provided a method of transmitting optical pulses between a transmitter and first and second receivers for the purposes of quantum key distribution, the method comprising guiding a plurality of optical pulses to either a first output port or a second output port, the first output port being in optical communication with the first receiver and the second output port being in optical communication with the second receiver; the guide being configured to output a proportion of the optical pulses at the first output port and a proportion of the optical pulses at the second output port, modifying the guide so as to change the proportion of the optical pulses output at the first output port.

Embodiments of the method enable the construction of a system which is able to meet the needs of particular receivers in real time. Such needs may arise because a particular receiver may need to agree a larger number of keys than other receivers. Alternatively, one of the receivers may be located a greater distance from the transmitter then the other and so pulses transmitted to it suffer greater attenuation. Embodiments enable a larger proportion of the pulses to be provided to the output port that leads to that receiver, so that the receiver receives the pulse rate it requires.

Furthermore, in prior art arrangements having splitters that are connected in series, receivers may not receive a sufficiently high pulse rate to maintain a connection, requiring lengthy re-connection procedures. The present disclosure enables the pulse rate to be equalized between proximate and remote receivers.

The method may further comprise transmitting optical pulses from a transmitter to one or more further receivers. The pulses may be randomly encoded with one or zero. A modulation may be applied to the pulses. Applying a modulation to the pulses may comprise polarizing the pulses using a randomly chosen polarization basis. Alternatively, applying a modulation to the pulses can comprise modulating the phase or the position of the pulse. After being encoded and modulated the pulses may be transmitted in accordance with QKD principles.

The value encoded onto the pulse and/or the modulation basis applied to the pulse and/or the time of transmission of the pulse may be recorded. The modulation basis may be the polarization basis. Furthermore, the transmitter may be connected for communication with each of the receivers by a respective non-quantum channel. The non-quantum channel may be a metallic wire, or an optical fiber or free space. The transmitter may send some or all of the recorded information to one or more of the receivers using the respective non-quantum channel.

The value that has been encoded onto the pulses (i.e. a one or a zero) may be measured at each of the receivers using randomly chosen modulation basis which may be a randomly chosen polarization basis. For each received pulse, the measured value and/or the polarization basis used for the measurement and/or the arrival time of the pulse may be recorded. Each of the receivers may send the measured value and/or the arrival time of the pulse to the transmitter using its respective non-quantum channel.

The optical pulses may be single-photon pulses. Single-photon pulses may be generated by a single-photon generator. The guide may comprise an optical splitter. The optical splitter may be separate to the transmitter and may be spaced apart from the transmitter. The splitter may be connected to the transmitter by an optical channel which may be an optical fiber. The optical fiber may also comprise the non-quantum channel. The splitter may comprise the first and second output ports and may comprise further output ports. Each output port may be capable of outputting single-photon pulses received from the transmitter. The first output port may be connected to the first receiver by an optical channel which may be an optical fiber. The second output port may be connected to the second receiver by an optical channel which may be an optical fiber. Further output ports may be connected to respective further receivers by respective further optical fibers.

Although in some embodiments the guide comprises a splitter, the skilled person would understand that it would be possible to provide a guide which did not comprise a splitter but which provides substantially the same functionality. A possible example of this would be an arrangement which provided a plurality of pulses to a first output for a short time period, then provided a plurality of pulses to a second output for a short time period, and repeated this cycle over a long period. Over time such an arrangement would direct a proportion of the input pulse stream to each of the outputs.

In some embodiments the guide comprises first and second splitters. In such embodiments the first splitter may comprise the first output port which may be connected to the first receiver. The second splitter may comprise the second output port which may be connected to the second receiver. The second splitter may be connected to an output port of the first splitter such that the second splitter receives pulses output by the first splitter. The guide may comprise one or more further splitters optically connected in series. The one or more further splitters may each be connected to a respective receiver. Each of the one or more further splitters may output a portion of the pulses input to it to its connected receiver, and the remainder to an input of the next splitter in the series.

The modification means may be automated and may comprise a control logic. The control logic may determine a modification to make to the guide. The control logic may apply the determined modification to the guide. The determination may comprise determining a modification which equalizes the pulse rate at each of the receivers. Alternatively the determination may comprise determining a modification which provides a higher pulse rate at one or more of the receivers than at one or more other of the receivers. The determination may comprise determining a modification which ensures that each of the receivers receives sufficiently high pulse rate such that the session is maintained, i.e. re-establishment procedures are not required. The determination may take the pulse rate demands of one or more of the receivers into account. One or more of the receivers may send the control logic an indication of the pulse rate demands at that receiver.

In embodiments in which the guide comprises one splitter, modifying the guide may comprise modifying the split ratio of the splitter. In embodiments in which there are more than one splitter, modifying the guide may comprise modifying the split ratio of some or all of the splitters. This may comprise applying an appropriate electrical impulse to the splitter or splitters. The split ratio of the splitter or splitters may be modifiable in a continuous fashion or may be modifiable in discrete steps.

BRIEF DESCRIPTION OF DRAWINGS

Embodiments will now be described in detail, for illustration purposes only, with reference to the appended drawings, in which.

DETAILED DESCRIPTION

Figure 1:
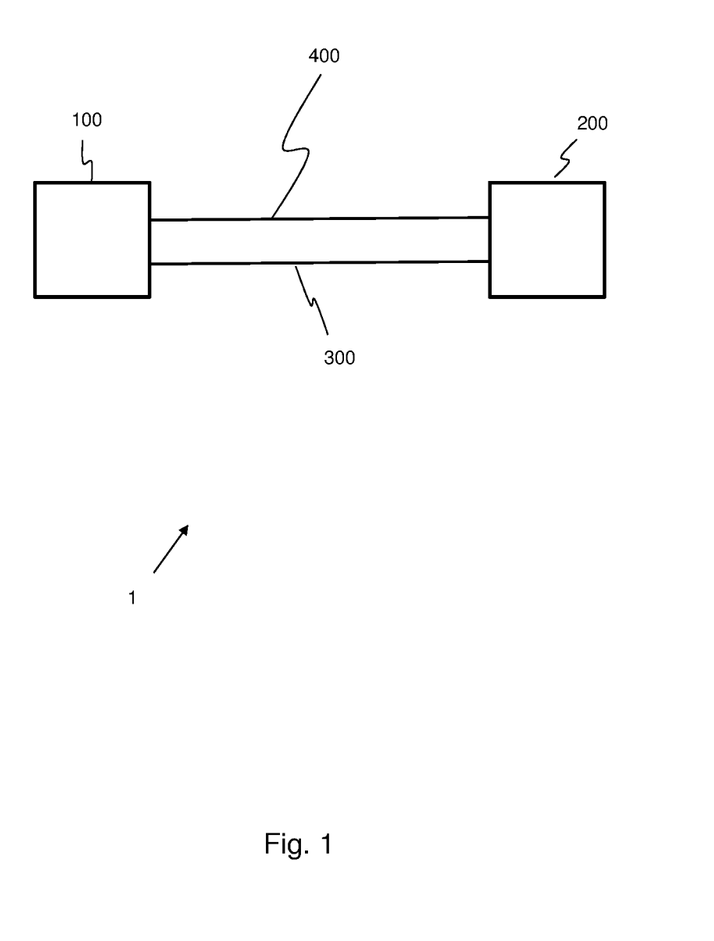
FIG. 1 is a schematic view of a basic QKD architecture comprising a single Alice and a single Bob.

The present disclosure concerns improvements in Quantum Key Distribution (QKD). QKD is a method of encryption involving distributing an encryption key from a first quantum node (known as Alice) to a second quantum node (known as Bob). FIG. 1 shows a schematic view of a simplified QKD arrangement in which Alice is shown at 100 and Bob at 200. Although multiple QKD protocols are in use, the present explanation relates to the commonly-used BB84 protocol. In particular, this explanation concerns a type of BB84 in which the modulation is applied to the pulses using polarization. According to that protocol, Alice 100 randomly generates a bit (either 0 or 1) and also randomly chooses one of two polarization bases: rectilinear and diagonal. Alice 100 then sends a photon that has been encoded with the chosen bit and the chosen polarization basis to Bob 200 via a quantum channel 300, such as an optical fiber. Bob 200 randomly selects one of the two polarization bases and measures the photon using its chosen basis. If Bob 200 uses the same basis as Alice 100 then the bit value measured by Bob 200 will match that applied to the photon by Alice 100. After repeating the process with a large number of photons, Alice 100 and Bob 200 perform a key agreement stage. In particular, Alice 100 informs Bob 200, via a non-quantum communication channel 400 (such as a copper cable), which of the two bases Alice 100 applied to each photon, along with the time of transmission by Alice 100 of each photon. Bob 200 then informs Alice 100 which of the two bases Bob 200 used when measuring each photon along with the time at which Bob 200 received each photon. Alice 100 and Bob 200 then discard their bit values for which Alice 100 and Bob 200 used different bases, and keep the remaining bit values. The remaining bit values constitute a secret key that Alice 100 and Bob 200 both have and which they can use to encrypt messages sent between them over the non-quantum channel 400.

Figure 2:
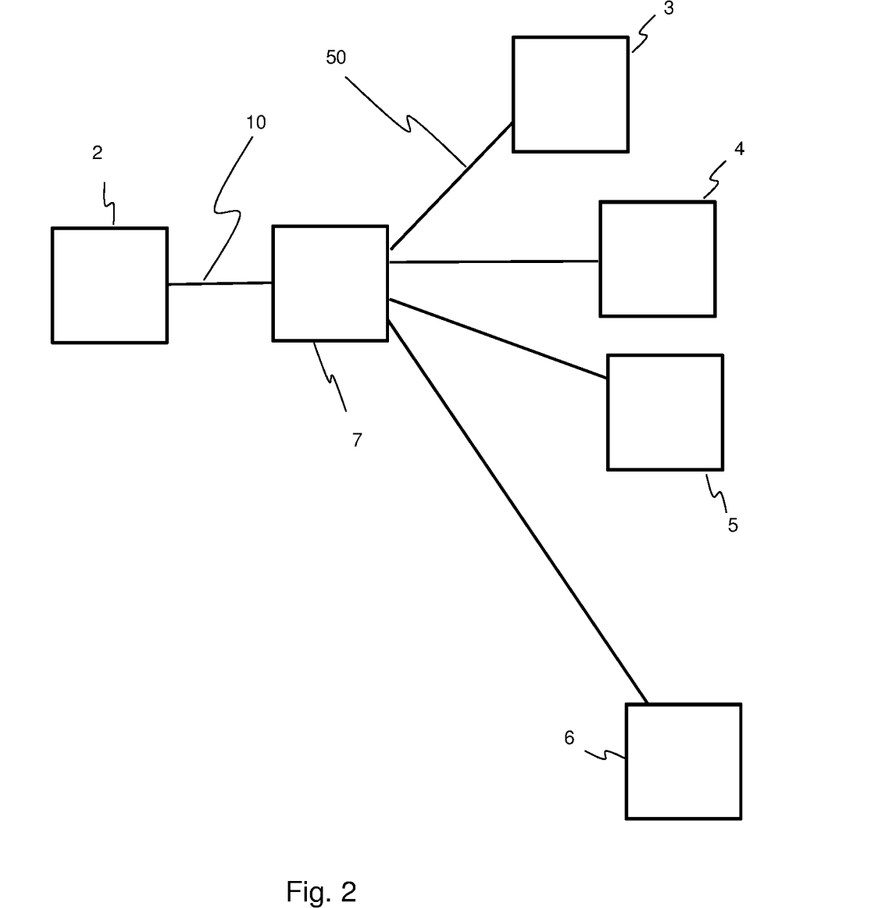
FIG. 2 is a schematic view of a known QKD architecture comprising a single Alice and multiple Bobs.

FIG. 2 shows a known QKD architecture. In particular, Alice 2 is connected to four different Bobs 3,4,5,6. An optical splitter 7 is provided in the optical path from Alice 2 to the four Bobs 3,4,5,6. Alice 2 is connected to the splitter 7 by an optical fiber 10. Each of the four Bobs 3,4,5,6 is connected to the splitter 7 by a respective optical fiber 50. Each of the Bobs 3,4,5,6 is also connected to Alice 2 by its own classical (i.e. non-quantum) channel (not shown).

In use, Alice 2 sends a series of photons to the splitter 7, each photon having been encoded with a random bit and a random polarization base as described above. Each photon passes through the splitter 7 and on to one of the Bobs 3,4,5,6. The splitter 7 diverts each photon to one of the Bobs 3,4,5,6 at random. Therefore, on average, 25% are directed towards each of the four Bobs. Each Bob measures the photons using a randomly-chosen polarization basis, and, once it has received enough photons to enable a secret shared key to be established with Alice 2, it does so using the key agreement stage described above. The key agreement stage involves Alice 2 and each one of the Bobs 3,4,5,6 exchanging their respective lists of polarization bases and takes place over the classical channel. Alice 2 and each one of the Bobs use the lists to establish a shared secret key which can be used to encrypt communications between them.

As can be seen in FIG. 2, Bob 6 is located further from the splitter 7 than the other Bobs 3,4,5. As the photons sent to Bob 6 travel further than the photons sent to the other Bobs 3,4,5, the photons transmitted to Bob 6 suffer a greater attenuation, meaning that more photons are lost. The key exchange rate between Alice and Bob 6 may therefore be lower than the key exchange rate between Alice and the other Bobs 3,4,5. This is undesirable as it slows down the establishment of a secure communication link between Bob 6 and Alice 2. Furthermore, if the photon receipt rate at Bob 6 falls below a threshold rate, it is necessary to re-initiate the connection, which is time consuming.

A further disadvantage of the arrangement of FIG. 2 is where one of the Bobs, say Bob 4, needs to establish more keys with Alice over a given time period than do the other Bobs. As the splitter splits the photons approximately equally, it may take a long time to establish all the keys at Bob 4, while photons are sent unnecessarily to other Bobs after they have finished establishing their keys.

Figure 3:
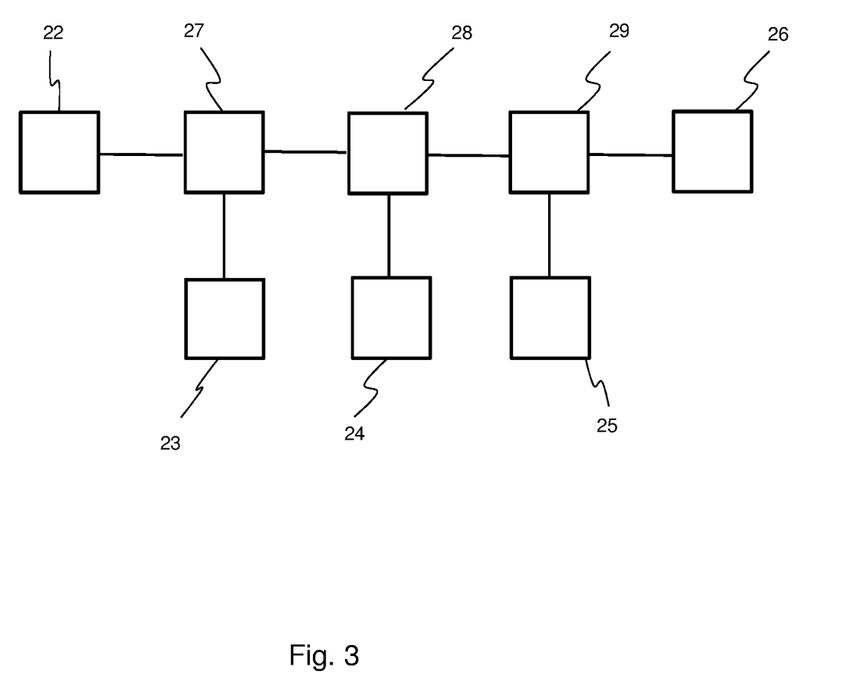
FIG. 3 is a schematic view of a different known QKD architecture comprising a single Alice, multiple Bobs and multiple splitters.

FIG. 3 shows an alternative known architecture for QKD. This may be advantageous over the architecture of FIG. 2 because in FIG. 3 all the Bobs are able to be served using only a single main optical fiber (plus much shorter branches). As in FIG. 2, the four Bobs 23,24,25,26 are each also connected to Alice 22 by a respective classical channel that is not shown in FIG. 3. Elements 27, 28 and 29 are 50:50 splitters. In use, Alice sends a stream of photons, encoded and polarized in the manner described above, to splitter 27. Splitter 27 directs approximately 50% of the photons towards Bob 23. Bob 23 detects the photons that reach it and performs the key agreement and exchange steps described above using its classical channel to Alice 22. The remaining approximately 50% of the photons pass through splitter 27 towards splitter 28. Splitter 28 directs approximately 50% of the photons arriving at it towards Bob 24. Bob 24 detects the photons that reach it and performs the key agreement and exchange steps described above using its classical channel to Alice 22. Splitter 28 also directs approximately 50% of the photons arriving at it towards splitter 29, which directs these photons approximately equally between Bob 25 and Bob 26, which each perform the key agreement and exchange steps described above using its respective classical channel to Alice 22.

Due to the architecture of this arrangement, Bob 23 receives approximately double the number of photons as Bob 24, which in turn receives approximately double the number of photons as Bobs 25 and 26. This can make key generation difficult for Bobs 25 and 26. The number of photons reaching Bobs 25 and 26 is further significantly reduced if Bobs 25 and 26 are located remotely with respect to the reminder of the arrangement. This is due to fiber loss. Furthermore, as mentioned above, if the photon receipt rate at a particular Bob falls below a threshold rate, it is necessary to re-initiate the connection to Alice 22, which is time consuming. Furthermore, a user may wish to add a further Bob to the arrangement of FIG. 3. This may be done, e.g. by 15 replacing Bob 26 with a splitter and connecting that splitter to Bob 26 and the new Bob. The additional splitter will further reduce the photon receipt rate at Bob 26 and at the new Bob. As noted above, this is likely to slow the process of key forming and may result in disconnection and consequent lengthy re-initiation procedures.

Figure 4:
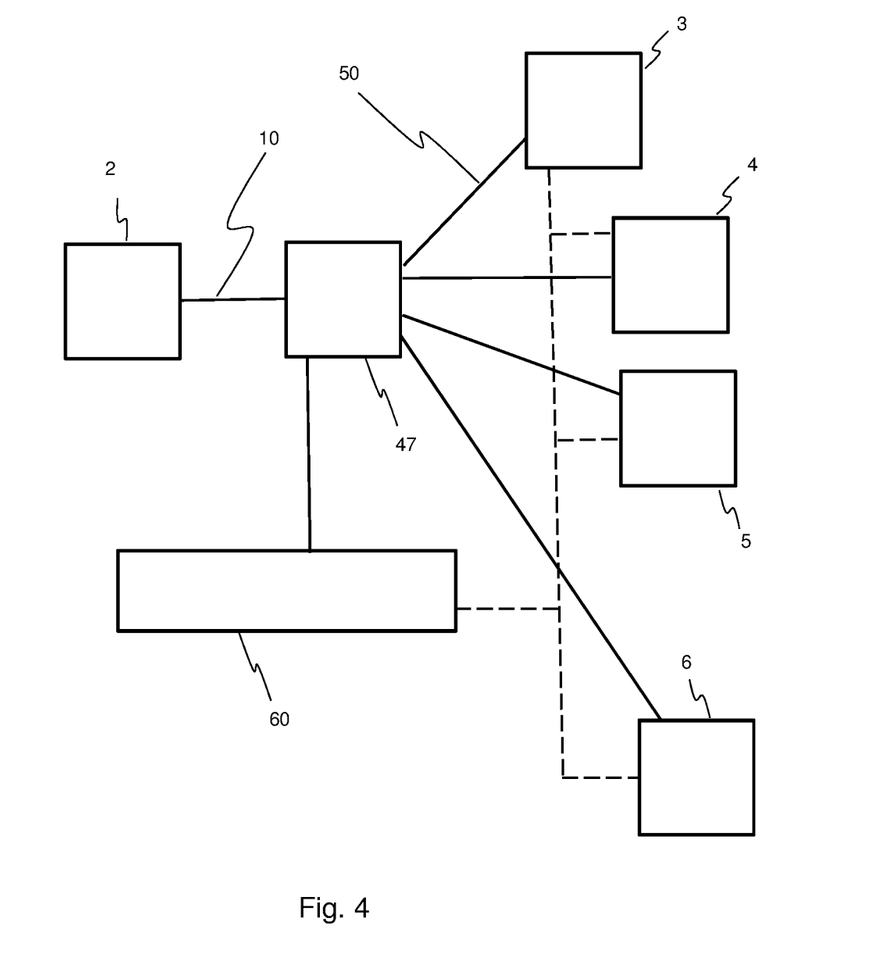
FIG. 4 is a schematic view of a first embodiment of the disclosure.

The known arrangements shown at FIGS. 2 and 3 have the disadvantages described above. FIG. 4 shows an arrangement in accordance with an aspect of the disclosure. FIG. 4 has many features in common with FIG. 2. In particular, Alice 2 is connected to four different Bobs 3,4,5,6. An optical splitter 47 is provided in the optical path from Alice 2 to the four Bobs 3,4,5,6. Alice 2 is connected to the splitter 47 by an optical fiber 10. Each of the four Bobs 3,4,5,6 is connected to the splitter 47 by a respective optical fiber 50. Each of the Bobs 3,4,5,6 is also connected to Alice 2 by its own classical (i.e. non-quantum) channel (not shown).

The principal difference between FIG. 4 and FIG. 2 is that in FIG. 4 the splitter 47 is a variable splitter. Variable splitters are known and so their structure will not be described in detail here. A variable splitter is an optical splitter, the split ratio of which can be changed in real time. That is to say, the proportion of photons that the splitter provides at each output can be varied. In the example of FIG. 2, the splitter 7 split the incoming signal equally between its outputs, such that approximately 25% of the photons output by the splitter 7 were directed towards each Bob. As noted above, photons travelling to Bob 6 are more highly attenuated than those travelling to Bobs 3,4 and 5 as Bob 6 is more remote. In the arrangement of FIG. 4, the split ratio of splitter 47 can be varied such that a greater proportion of photons are directed towards Bob 6 than are directed towards Bobs 3,4 and 5 in order to compensate for the increased attenuation. So, for example, variable splitter 47 may be adjusted such that 20% of the photons output from splitter 47 are directed towards each of Bobs 3,4 and 5 and the remaining 40% of the photons output from splitter 47 are directed towards Bob 6.

Furthermore, it may be that another of the Bobs, say, Bob 4, wishes to agree a larger number of keys with Alice 22 than do the other Bobs 3,5 and 6. In other words, Bob 4 has a higher key exchange rate demand than do Bobs 3,5 or 6. In such a situation, Bob 4 sends controller 60 an indication of the key exchange rate that it requires with Alice 22, along with the photon receipt rate that it is currently experiencing. As in the example above, the split ratio of splitter 47 can be varied such that a greater proportion of photons are directed towards the Bob that needs it, in this case Bob 4, than are directed towards the other Bobs 3,4 and 5. So, for example, variable splitter 47 may be adjusted such that 20% of the photons output from splitter 47 are directed towards each of Bobs 3,5 and 6 and the remaining 40% of the photons output from splitter 47 are directed towards Bob 4.

The adjustment of variable splitter 47 described above is carried out by a controller 60 in the following way. The controller 60 is provided with an electrical connection (shown in FIG. 4 by a dashed line) to each of Bobs 3,4,5 and 6. In use, each of the Bobs 3,4,5 and 6 send the controller 60 an indication of the photon receipt rate that it is currently experiencing along with an indication of the photon receipt rate that it requires (due to its current key exchange rate demands). If the ratio of the actual photon receipt rate to required photon receipt rate for a particular Bob, e.g. Bob 6, falls significantly below that of the other Bobs 3,4,5, the controller 60 sends an instruction to splitter 47 to increase the ratio of photons being output towards Bob 6 and decrease the ratio of photons being output towards Bobs 3,4 and 5.

Figure 5:
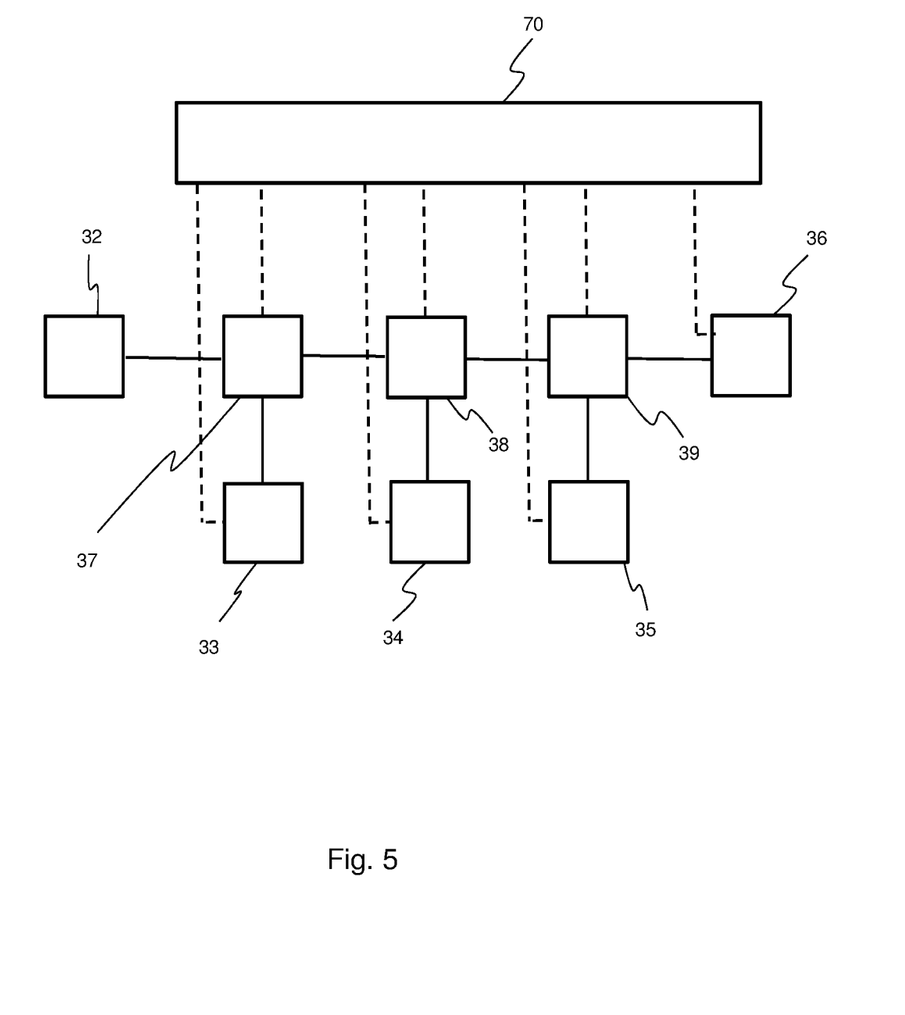
FIG. 5 is a schematic view of a second embodiment of the disclosure.

FIG. 5 shows an embodiment of the disclosure which has many features in common with FIG. 3. In particular, Alice 32 is connected to a single optical channel. The optical channel is provided with branched connections to four Bobs 33,34,35,36. The four Bobs 33,34,35,36 are also each connected to Alice 32 by a respective classical channel that is not shown in FIG. 5. The principal difference between FIG. 5 and FIG. 3 is that in FIG. 5 the splitters 37, 38 and 39 are variable splitters.

As in FIG. 3, Alice sends a stream of photons, encoded and polarized in the manner described above, to the four Bobs 33,34,35,36 via respective splitters. As the split ratio in FIG. 5 can be adjusted, the split ratio of the splitters need not be 50%. The split ratio of each splitter can be set in order to equalize the photon receipt rate at the Bobs 33,34,35,36. This enables key formation at each of the Bobs to take place at approximately the same rate—with no individual Bobs falling behind in their key formation rate.

The adjustment of variable splitters described above is carried out by a controller 70 in the following way. The controller 70 is provided with an electrical connection (shown in FIG. 5 by dashed lines) to each of splitters 37, 38, 39. In a manner analogous to that described above in relation to FIG. 4, each of the Bobs 33,34,35,36 sends the controller 70 an indication of the photon receipt rate that it is currently experiencing along with an indication of the photon receipt rate that it requires (due to its current key exchange rate demands). If the ratio of the actual photon receipt rate to required photon receipt rate for a particular Bob, e.g. Bob 36, falls significantly below that of the other Bobs, the controller 70 determines appropriate split ratios to apply to each of the splitters 37, 38, 39 in order to increase the photon receipt rate at Bob 36 while providing an appropriate photon receipt rate at the other Bobs, in view of their own indicated demands.

This technique could also be of benefit if, for example, the key formation rate requirement at a particular Bob increases to a higher rate. This extra demand can be met in real time by the controller 70 determining and applying appropriate split ratios to apply to each of the splitter 37, 38, 39 to meet the increased photon rate demand of the particular Bob, while also ensuring the photon rate demands of the other Bobs are also met.

This technique could also be of benefit if a user adds an extra Bob to the arrangement. This may be done, e.g. by replacing Bob 36 with a splitter and connecting that splitter to both Bob 36 and the new Bob. The additional splitter will further reduce the photon receipt rate at Bob 26 and at the new Bob, which may slow the process of key forming and may result in disconnection and consequent lengthy re-initiation procedures. However, in use, each of new Bob and Bob 36 send the controller 70 an indication of the photon receipt rate that it is currently experiencing along with an indication of the photon receipt rate that it requires (due to its current key exchange rate demands). If the ratio of the actual photon receipt rate to required photon receipt rate for either the new Bob or Bob 36 falls significantly below that of the other Bobs 33, 34, 35, the controller 70 determines appropriate split ratios to apply to each of the splitters 37, 38, 39 in order to increase the photon receipt rate at the new Bob and Bob 36 while providing an appropriate photon receipt rate at the other Bobs 33, 34, 35 in view of their own indicated demands. This reduces the likelihood of slow key forming or disconnection at the new Bob or Bob 36.

The invention claimed is:

1. A system for transmitting optical pulses for quantum key distribution, the system comprising:
   a transmitter configured to transmit a plurality of optical pulses;
   a first receiver and a second receiver configured to receive some or all of the plurality of optical pulses;
   a guide for guiding the plurality of optical pulses, the guide having a first output port and a second output port, the first output port being in optical communication with the first receiver and the second output port being in optical communication with the second receiver, the guide being configured to output a first proportion of the plurality of optical pulses at the first output port and a second proportion of the optical pulses at the second output port; and
   control logic separate from the transmitter and in electrical connection with the guide and the first and second receivers, the control logic being capable of modifying the guide so as to change the first proportion of the optical pulses output at the first output port based on a current pulse receipt rate and a required pulse receipt rate received from each of the first receiver and the second receiver.

2. The system as claimed in claim 1, further comprising one or more further receivers configured to receive some or all of the plurality of optical pulses.

3. The system as claimed in claim 1, wherein the guide comprises an optical splitter.

4. The system as claimed in claim 3, wherein the optical splitter is connected to the transmitter by an optical fiber.

5. The system as claimed in claim 3, wherein the optical splitter comprises the first output port and the second output port.

6. The system as claimed in claim 1, wherein the guide comprises a first splitter and a second splitter.

7. The system as claimed in claim 6, wherein the second splitter comprises the second output port.

8. The system as claimed in claim 6, wherein the guide comprises one or more further splitters.

9. The system as claimed in claim 8, wherein the one or more further splitters are optically connected in series.

10. A method of transmitting single-photon pulses for quantum key distribution, the method comprising:
    using a guide to guide a plurality of optical pulses received from a transmitter to either a first output port or a second output port, the first output port being in optical communication with the first receiver and the second output port being in optical communication with the second receiver, the guide being configured to output a first proportion of the optical pulses at the first output port and a second proportion of the optical pulses at the second output port;
    sending an indication of a current pulse receipt rate and a required pulse receipt rate from each of the first receiver and the second receiver to a control logic separate from the transmitter; and
    modifying the guide so as to change the first proportion of the optical pulses output at the first output port based on the current pulse receipt rate and the required pulse receipt rate received from each of the first receiver and the second receiver.

11. The method as claimed in claim 10, wherein modifying the guide comprises modifying the first proportion of optical pulses guided to the first output port relative to the second proportion of the optical portions guided to the second output port.

12. The method as claimed in claim 11, wherein the first proportion of optical pulses guided to the first output port relative to the second proportion of the optical portions guided to the second output port is modified in a continuous fashion.

* * * * *

UNITED STATES PATENT AND TRADEMARK OFFICE
CERTIFICATE OF CORRECTION

| | | |
|---|---|---|
| PATENT NO. | : 12,250,298 B2 | Page 1 of 1 |
| APPLICATION NO. | : 17/593683 | |
| DATED | : March 11, 2025 | |
| INVENTOR(S) | : Andrew Lord | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 366 days.

Signed and Sealed this
Sixteenth Day of December, 2025

John A. Squires
*Director of the United States Patent and Trademark Office*